June 7, 1960 G. R. COSS 2,939,639
FOOD WASTE DISPOSER
Filed April 16, 1956 8 Sheets-Sheet 1

Fig. 1

Inventor
GEORGE R. COSS

June 7, 1960

G. R. COSS

2,939,639

FOOD WASTE DISPOSER

Filed April 16, 1956

Inventor
George R. Coss
by [signature] Attys.

June 7, 1960    G. R. COSS    2,939,639
FOOD WASTE DISPOSER
Filed April 16, 1956    8 Sheets-Sheet 3

Inventor
GEORGE R. COSS
by Hill, Sherman, Meroni, Gross & Simpson
Attys.

Inventor
George R. Coss

June 7, 1960 G. R. COSS 2,939,639
FOOD WASTE DISPOSER
Filed April 16, 1956 8 Sheets-Sheet 5

Inventor
GEORGE R. COSS

June 7, 1960

G. R. COSS 2,939,639

FOOD WASTE DISPOSER

Filed April 16, 1956

Inventor
GEORGE R. COSS

June 7, 1960 G. R. COSS 2,939,639
FOOD WASTE DISPOSER
Filed April 16, 1956 8 Sheets-Sheet 8

Inventor
GEORGE R. COSS

United States Patent Office 2,939,639
Patented June 7, 1960

2,939,639

FOOD WASTE DISPOSER

George R. Coss, Benton Harbor, Mich., assignor to Whirlpool Corporation, a corporation of Delaware Filed Apr. 16, 1956, Ser. No. 578,400

11 Claims. (Cl. 241—100.5)

The present invention relates to improvements in food waste disposers and particularly to the domestic type which are connected to a kitchen sink for grinding kitchen wastes and scraps and washing them down the drain with water from the sink.

Food waste disposers or grinders of the type referred to are used in the household kitchen for grinding and disposing of kitchen waste material or garbage and washing the material down the sink drain. The disposer mechanism is generally connected to the drain of the sink and to the drain pipe leading away from the sink and operates by grinding, comminuting, crushing, cutting and shredding kitchen waste material or garbage in the form of vegetables, meat, bones, rinds and the like in order that it may be reduced to small enough particles in order to be flushed into the sewer system through the drain pipes.

As used in the household kitchen, the mechanisms must be operated by housewives and it is therefore understandable that in order to be successful the disposers must be simple and reliable in operation so as not to require frequent adjustment or attention. Inconveniences of operation, such as jamming of the machine or stalling under load, must be avoided since these require detailed attention and make the device less suitable for operation in a household kitchen.

In order to be successful the mechanism should accept the food waste and garbage rapidly and readily in all shapes and sizes and dispose of the waste by grinding it quickly. The mechanisms heretofore used are frequently very noisy in operation especially with grinding of certain types of hard wastes such as bones which makes them undesirable in this respect.

The installation of waste disposers is frequently made in older houses after the sink has been installed therefore making it important that the disposer be easily and quickly installed with a minimum of difficulty. This is especially desirable in order that installation can be made by the home craftsman.

It is an objective of the present invention to provide a food waste disposer mechanism which will avoid the disadvantages above referred to and which will accept waste material of various sizes and various consistencies and in large volumes continuing to grind the waste material without slowing or stalling the motor.

Another important objective of the invention is to provide a food waste disposer which is capable of operation under all conditions without excessive undesirable noise and in which the noise level during operation is considerably reduced.

Another object of the invention is to provide a food waste disposer which is constructed so as to be easily and readily installed and which can be installed without the use of special tools in a confined area and in sink locations wherein the drain line may extend to the sink from any direction.

A more specific object of the invention is to provide a food waste disposer which is capable of accepting lightweight bulky refuse such as corn cobs, melon rinds, etc. avoiding the tendency of the material to bridge over or hang up in the grinding chamber and which will continue to feed material which has this consistency.

Another more specific object of the invention is to provide a food waste disposer with a grinding chamber having a resilient elastomeric wall which improves the feeding ability of the grinder and which considerably reduces the noise transmission of the grinding chamber.

Another object of the invention is to provide an improved resilient noise-absorbing and vibration-absorbing mounting for the grinder housing which will improve the overall operation of the mechanism.

Another object of the invention is to provide a food waste disposer in which the grinder is capable of starting when filled with waste material without jamming or stalling the rotor of the grinder.

Another object of the invention is to provide an improved stationary shredder ring for the grinder which is capable of longer wear and providing a mount for the ring which permits easy reversal of the position of the shredder ring.

Another object of the invention is to provide a food waste disposer design which improves the capacity of the mechanism without increasing the overall size.

Another object of the invention is to provide a food waste disposer in which operation of the disposer is prevented unless a stream of water of sufficient quantity is fed into the disposer to wash away the ground waste material.

A further feature of the invention is to provide a structural design which during operation will form a wall of sound insulating water across the intake opening of the grinder and thereby reduce the noise which is emitted from the grinder during grinding operation.

A general object of the invention is to provide a food waste disposer in which the overall grinding efficiency and operation is considerably improved.

Other objects and advantages will become more apparent in the following specification and claims taken in connection with the appended drawings, in which:

Figure 1:
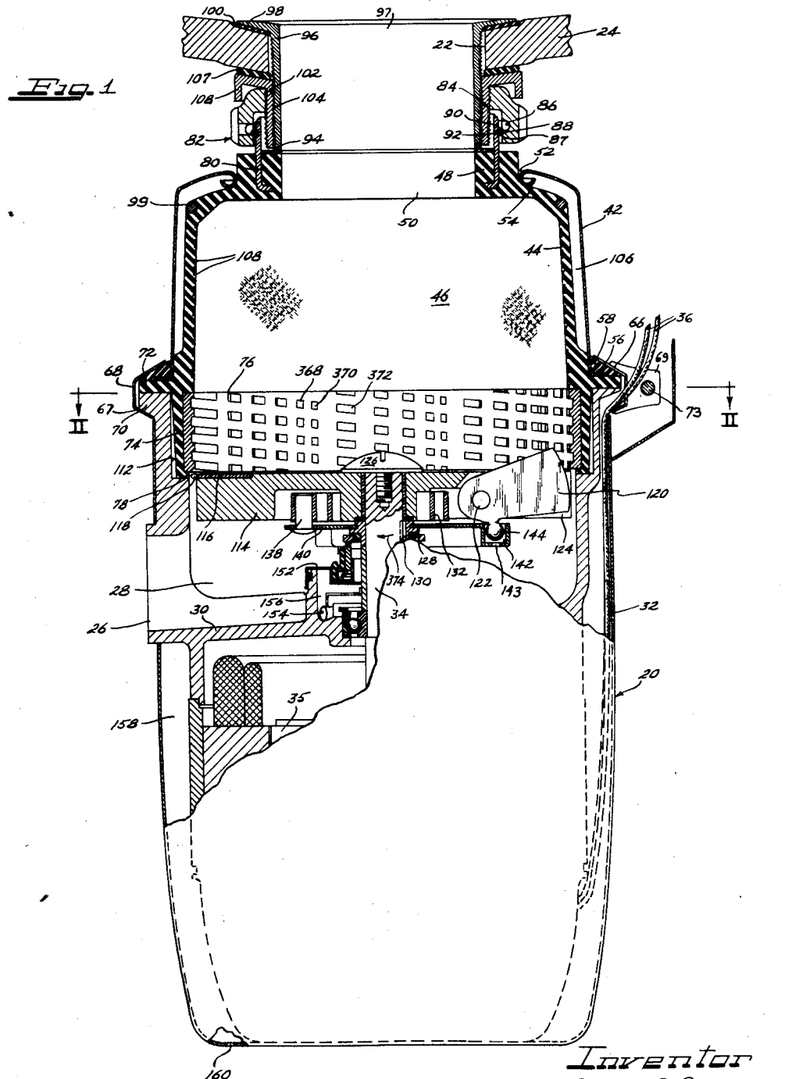
Figure 1 is a front elevational view of a grinder with the upper portion of the grinder shown in vertical section to better illustrate the operating parts.

In the overall view of the mechanism, as illustrated in Figure 1, which shows the preferred embodiment of the invention, the disposer or grinder is shown enclosed in a casing or housing 20. The housing and the enclosed and other associated mechanism is supported from the drain opening 22 of the metal bottom of the sink 24. In this position, waste material is fed to the disposer from the sink and water from the sink washes into the disposer to wash the ground waste material down a drain. For this purpose, the housing 20 is provided with a discharge conduit 26 which connects to a suitable drain, such as is normally provided for a sink.

The discharge conduit 26 leads from a discharge chamber 28 formed in a casting 30, with the discharge chamber being positioned beneath the grinder which will later be described in detail. The casting 30 is enclosed in the lower shell 32 of the housing, which also encloses the drive motor 35. The motor is secured in place by being attached to the casting 30. The motor has a drive shaft 34 which drives the rotary part of the grinder in various ways which will later be described, and the motor is supplied with the electricity by leads or wires 36 which lead out of the housing to connect to the electrical circuit and control switch.

The upper part of the disposer is comprised of an upper outer metal shell 42, which forms a protective shell for the inner liner 44 and which supports the lower part of the housing.

The inner liner 44 is substantially cylindrical in shape to form a hollow grinding chamber 46. The upper end of the inner liner 44 tapers inwardly to terminate at its upper end in a heavy rubber collar 48 which surrounds a circular opening or throat 50 leading into the grinding chamber. The outer shell 42 terminates in its upper end in a rolled under annular bead 52 which rests on the shoulder 54 beside the annular heavy rubber collar 48 to thereby support the weight of the housing on the outer shell leaving the inner liner 44 relaxed in order that it may flutter or vibrate during operation of the grinder.

To carry the load of the housing, the upper shell 42 is connected to the lower shell 32 at a central portion in the housing where the two shells are joined. To this end, the upper shell has an outwardly extending annular flange 56 at its lower edge. Resting on this flange is an annular rubber gasket ring 58 having an inclined upper sloping shoulder. The casting 30 and the motor which is supported on the casting, rests in the lower shell by means of an annular shoulder or flange 70 at the upper edge of the casting which projects radially outwardly of the lower shell, as is well illustrated in Figure 1.

The relaxed resilient liner 44 for the grinding chamber is also provided at its base with an outwardly extending annular flange 72 which projects into an annular clamp ring 68 having tapered flanges 66 and 67.

Figure 2:
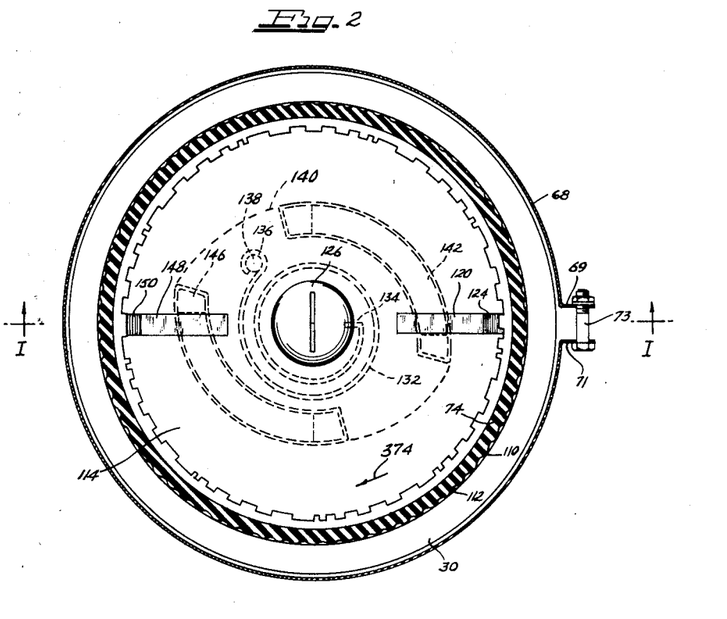
Figure 2 is a horizontal sectional view taken along line II—II of Figure 1 to show the construction of a shredder ring and a rotor.

The annular clamp ring 68 is split at one side and turned outwardly to form projecting brackets 69 and 71, as is shown in Figure 2. These brackets are provided with holes through which extends a tightening bolt 73. Tightening this bolt will constrict the clamp ring 68 and will draw the upper flange 66 of the clamp ring tightly against the ring 58 and tend to draw the upper shell 42 down tightly against the flange 72 of the grinding chamber liner 44 and draw the lower flange 67 tightly against the upper flanged edge 70 of the casting to hold the parts of the housing firmly together.

At the lower end of the grinding chamber, as is defined by the resilient liner 44, the liner material forms a circular socket 74 in which the shredder ring 76 is mounted and is held. At the lower edge of the socket 74 is an underhanging lip 78 which holds the shredder ring in place, but which is formed of the same material as the resilient liner 44 and which is flexible so as to enable the operator to pull the shredder ring out of its socket to invert it or replace it with a new shredder ring. The operation of the shredder ring in conjunction with the rotor in grinding the waste material will be explained in greater detail later.

For suspending or mounting the entire housing 20 for the grinder on a sink, the thicker rubber collar 48 at the upper end of the liner 44 carries a telescoping mounting sleeve 80. This sleeve is circular in shape and is flanged inwardly at the base so as to secure itself to the thick rubber collar in which it is embedded in order to thereby support the weight of the housing. The collar therefore supports the housing transmitting the support to the upper shell 42, but forming a resilient sound and vibration insulator.

The telescoping sleeve mounting is secured to a sink connector by a mounting nut 82. The mounting nut 82 carries internal threads and is screwed to an externally threaded tightening ring 84. The mounting nut is flared outwardly at its lower edge to create a space between the threaded tightening ring 84 and the mounting nut 82. The telescoping mounting sleeve moves upwardly into this space and is there secured for supporting the housing of the disposer. For this purpose the flared lower end of the mounting ring carries a large internal groove 86 which is joined at its edge by another smaller groove 87 of smaller cross-sectional diameter. The mounting sleeve 80 carries an external groove 90, and between this groove 90 and the smaller groove 87 of the mounting nut is positioned a wire locking ring 92. This wire ring rests in the two grooves 87 and 90 and is sufficiently large to prevent the mounting sleeve from sliding out from within the mounting nut. The wire locking ring 88 is split and is biased to spring inwardly to a smaller diameter so that it will tend to rest in the groove 90 in the mounting sleeve. It will be seen from Figure 1 that as the weight of the disposer rests on the mounting sleeve it pulls downwardly on the wire ring forcing it into the smaller groove 87. If, however, the angular position of the disposer is to be changed it can be lifted slightly so that the wire locking ring moves upwardly to the larger groove 86 within the mounting nut. In this position the disposer housing can be rotated about its vertical axis to face in any direction. The purpose of this rotation is to be able to align the discharge opening 26 with any existing drain pipe. It will thus be seen that the disposer can quickly and readily be mounted in location without paying attention to the angular alignment which can be made after the disposer is mounted in place.

To seal the mouth 50 of the disposer and prevent waste fluids from passing outwardly to foul the threads of the mounting nut 82, a gasket 94 rests on top of the heavy rubber collar 48 within the mounting sleeve 80. As the mounting nut 82 is screwed up on the tightening ring 84 the gasket 94 is pulled up against the lower edge of a connector ring 96 which supports the disposer mechanism on the drain opening 22 of the sink 24. Thus, the gasket 94 effectively seals the junction of the upper edge of the rubber collar 48 and the lower edge of the connector ring 96.

By threading the mounting nut 82 upwardly on the tightening ring and drawing the gasket 94 tightly up against the lower edge of the connector ring 96, the wire locking ring 88 is also pulled down into the lower groove 87 of the mounting nut. In this location, the wire locking ring is pinched between the mounting sleeve and the mounting nut and thus the disposer housing is firmly supported and will not tend to accidentally rotate.

Figures 11, 13, 14:
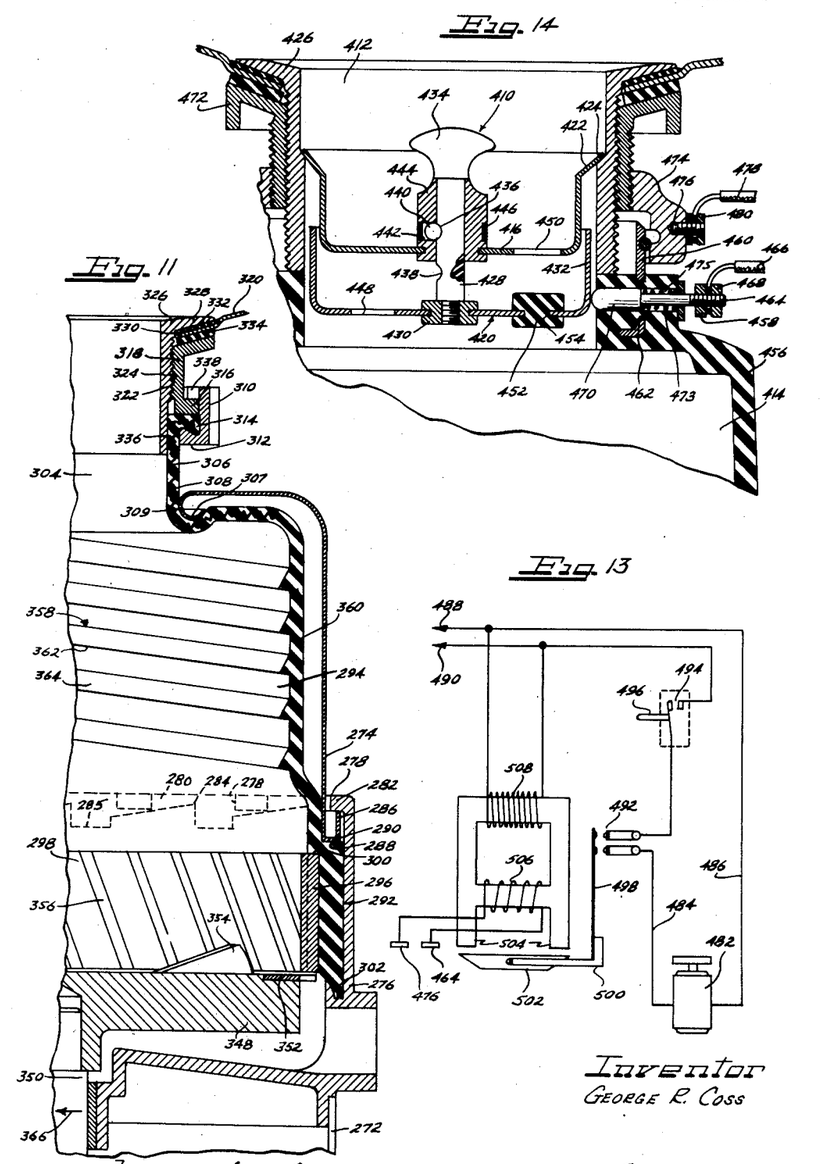
Figure 11 is a vertical sectional view taken through the center of a grinder and illustrating an interior construction which may be adopted according to the teachings of the invention.
Figure 13 is a schematic showing of the circuit diagram which operates in conjunction with the mechanism illustrated in Figures 12 and 14.
Figure 14 is a detailed elevational view in vertical section taken through the upper end of a grinder and illustrating the mechanism for controlling the flow of water into the grinder.
Figure 12:
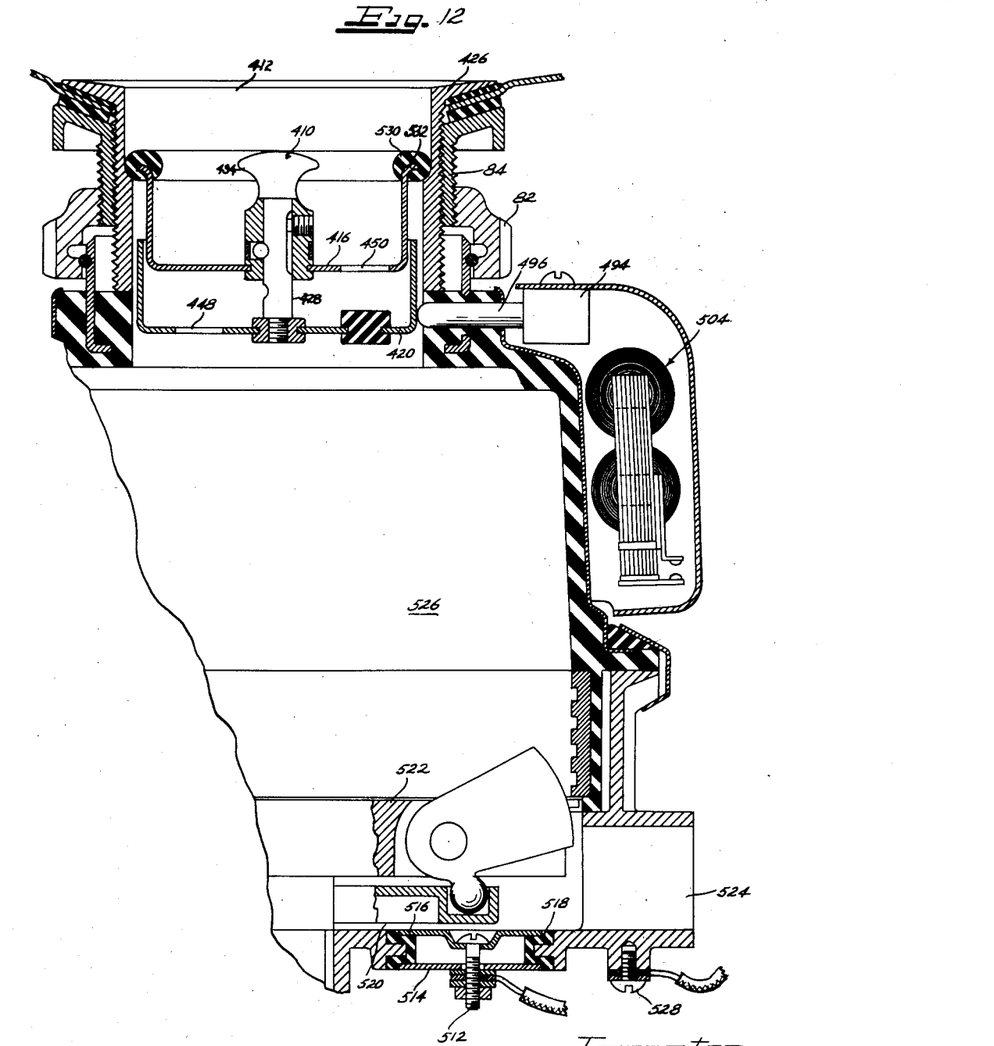
Figure 12 is a detailed vertical sectional view taken through the center of a disposer to illustrate the details of construction of various operating elements.

In some instances, it may be desirable to omit the circular gasket 94 which is between the heavy rubber ring 48 and the lower edge of the connector ring 96. This will permit satisfactory operation since the resiliency of the heavy rubber ring will seat firmly against the lower edge of the connector ring 96 and a construction with the gasket omitted is shown in Figures 12 and 14.

Since the lower end of the mounting sleeve 80 is mounted in the heavy rubber collar 48, the vibration and operational noise of the disposer will be assimilated by the resiliency of the collar 48. Also, since the weight of the machine pulls downwardly against the sleeve 80, and against the rubber of the liner just adjacent the sleeve, the sleeve and adjacent rubber are under tension to better enable it to assimilate the vibrations and shocks of operation of the disposer, and to more firmly support the disposer.

To prevent the body of the resilient rubber lining 44 which surrounds the grinding chamber from collapsing, a reinforcing ring 99 is provided which is annular in shape and which is embedded in the rubber at the upper end of the liner 44 of the grinding chamber. This ring holds the liner 44 in cylindrical shape preventing it from collapsing, and yet permits it to be flexible and free to flutter during operation.

Continuing with the description of the support for the disposer, the upper connector ring 96 is circular in shape so as to fit within the drain opening 22 of the sink and the central opening defines a mouth portion 97 leading downwardly from the sink into the throat or opening 50 leading into the grinding chamber 46. At the upper edge of the connector ring 96 is an outwardly extending flange 98 which supports the connector ring against the edge of the sink opening 22. A sealing gasket 100 may be positioned between the metal of the sink and the flange 98 of the connector ring to prevent moisture from leaking down to the threads on the outer side of the flange and to help insulate the vibrations of the disposer from the sink.

Figure 3:
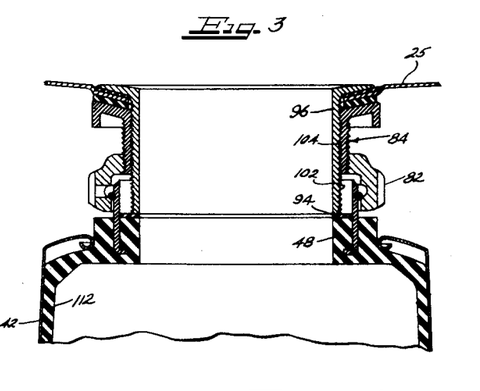
Figure 3 is a detailed elevational view in vertical section of the upper end of the mechanism illustrating an alternative way of constructing a liner of a grinding chamber and illustrating the operation of a connector for supporting the grinder housing from a sink.

As is shown in Figure 3, as compared with Figure 1, the connector members can readily adapt for connection to a sink formed of thick material as is shown by the sink 24 in comparison with a sink formed of thin material such as shown by the sink 25 in Figure 3. To conform to a sink of thinner material the tightening ring 84 is merely screwed further up on the threads 102 externally carried on the connector ring 96. The mounting nut 82, of course, must then be screwed further down on the external threads of the tightening ring 84. Since either the upper edge of the heavy rubber collar 48 or the gasket 94 engages the bottom edge of the connector ring 96, this adjustment will make no difference to the support of the housing for the disposer. Thus, by merely changing the amount that the tightening ring must be screwed up on the connector ring and changing the location of the mounting nut, the disposer can be readily attached to the drain opening on a sink of any thickness.

Although the disposer is rigidly connected to the sink, the primary vibrations and noises created in the disposer will be assimilated by the heavy rubber support collar 48 which is under tension to support the weight of the disposer. Other vibrations and noises will have been assimilated before they reach the upper portions of the grinder due to the rubber resilient wall of the grinding chamber and due to the special soft resilient mounting for the shredder ring which will be described later.

It is important to the operation of the grinder that the noises be assimilated and kept to a minimum since several factors which are inherent in grinder operation emphasize and amplify the effect of noises. First, the grinder or disposer is mounted in the flat bottom of a sink 24 which acts as an amplifier or sounding board to increase the noise of vibrations which are created by the operation of the grinder. Secondly, the open mouth 97 leading to the grinding chamber acts somewhat as an amplifier to channel noises upwardly where they are released into the open sink and into the kitchen.

The connector ring 96 carries external threads 102 which permit the tightening ring 84 to to be threaded up on the outer surface of the connector ring. The tightener ring carries internal threads 104 for threading up on the connecting ring as well as external threads to permit the mounting nut to be screwed upon it. As viewed in their entirety, the connector ring 96, the tightening ring 84, the mounting nut 82 and the mounting sleeves 80 may be regarded as an adjustable support for the disposer or grinder. A gasket 107 may be positioned between the flange 108 of the tightening ring to provide an additional moisture seal and an additional sound insulator. The flange 108, upon tightening the tightening nut 84, is brought up tightly against the lower edge of the sink opening 22 to rigidly secure the support or connector to the sink. In spite of this rigid connection, a certain amount of lateral deflection is afforded the disposer by virtue of the flexible support collar 48 which carries the weight of the disposer and which transmits the supporting forces of the sink to the upper shell 42 which has the bead 52 resting on the shoulder 54 beside the heavy rubber collar 48.

In reference to the collar 48 and to the flexible inner liner 44, a material such as rubber preferably is used because of its wearing ability and because of its resilient nature. It will be understood, however, that substitute materials may be used which have scuff resistance, resiliency and wearing ability and which are resistant to the chemistry and abrasiveness of the waste materials which must be handled by the disposer.

As the waste material is fed downwardly from the sink through the mouth 97 and the opening 50 into the grinding chamber 46, it passes down to the grinder of which the shredder ring 76 is a part. Since the walls 44 of the liner of the grinding chamber are relaxed and flutter from vibrations in the machine during operation, the waste material will have a constant tendency to feed into the grinder and will not tend to hand up or bridge across the grinding chamber to prevent the material from continuing to feed to the grinder. Also, certain bulky materials such as corn cobs, melon rinds, etc., which may become jammed in the grinding chamber will not encounter this disadvantage because of the space 106 left between the liner 44 of the grinding chamber and the upper shell 42. This permits the relaxed chamber wall to bulge outwardly to conform to the shape of the materials which are fed into the grinding chamber and this outward bulging will create a simultaneous tension in another portion of the wall to flex the wall and improve its feeding operation by forcing a change in the position of the waste material which rests against this wall.

To increase the scuff-resistant ability and wearing ability of the inner surface of the liner 44 of the grinding chamber, a scuff-resistant material 108 may be embedded into the wall, as is shown in Figure 1. The material is over the entire inner wall of the grinding chamber but it is shown in dotted separated areas only for simplifying the appearance of the drawing. This material may be in the form of cording formed of cotton or nylon or in the form of wire. Such reinforcing is valuable in preventing tears from resulting to the flexible walls as may occur with material such as sharp bones which are churned within the grinding chamber during the grinding operation.

Figure 4:
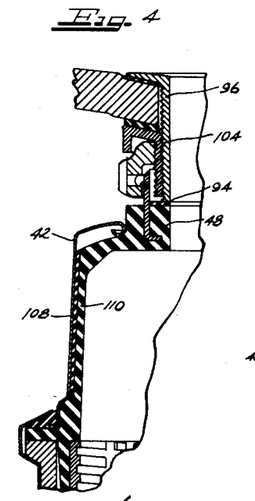
Figure 4 is a fragmentary view in vertical section of a portion of the end of a grinder illustrating another manner of attaching a liner in the grinding chamber.

In some instances, it may be desirable to eliminate the hollow space 106 between the liner 44 and the outer shell 42. In order to retain the vibrational action of the liner and the resilient nature of the liner wall a soft layer of resilient or sponge-like rubber 108 is located between the outer shell 42 and the inner liner 110, as is illustrated in Figure 4. In this construction the layer of soft resilient material 108 is secured such as by cementing to the outer shell 42 and the inner liner 110 is firmly adhered to the soft material 108. This construction insures that the inner liner 110 will retain its cylindrical shape and avoids the necessity of providing the reinforcing ring which is shown at 99 in Figure 1.

A further construction which may be adopted is illustrated in Figure 3 wherein the inner liner 112 is bonded directly to the outer shell 42. This is to reduce the fluttering action of the relaxed wall during operation but will retain the features of the resilient scuff-proof wall which improves the feeding ability and the grinding operation of the disposer. In this instance, the cylindrical shape of the grinding chamber is firmly fixed but the scuff-proof properties of the walls, which may be formed of a hard rubber, are retained to prevent wear which will occur in a grinding chamber which is formed of metal. Further, the rubber liner presents a material which is resistant to the acids of waste materials and being cast in a single integral section of material, avoids the presence of crevices or seams which retain waste materials that corrode and cause wear in an ordinary metallic grinding chamber.

The rubber of the grinding chamber liner 44 is extended vertically downwardly at its base to form a socket 74 in which is seated the shredder ring as held in place by the lip 78. The socket 74 is cylindrical in shape with vertical walls so that the shredder ring 76 may be placed either in its upright position or inverted. This will permit the material being ground to approach the grinding surfaces in one direction when the shredder ring is upright and to approach the grinding surfaces in the opposite direction when the shredder ring is inverted. The inverting of the shredder ring therefor presents a new set of grinding edges to the material being ground and permits the material to be moved in the opposite direction against the previously used edges to create a sharpening effect upon these edges.

In addition to the shredder ring being cylindrical in shape it is to be noted that the grinding chamber is cylindrical in shape with vertical walls. This obtains the larger grinding chamber and increased capacity permitting the housewife to place more material into the grinding chamber reducing the amount of time required for feeding material to the disposer. The enlarged cylindrical grinding chamber also permits the use of a large shredder ring and thereby increases the capacity of the disposer.

One of the important features of the invention is the mounting of the shredder ring completely in a resilient rubber mount to thereby serve two important purposes. One of these purposes is the assimilation of a considerable amount of noise which is due largely to the impact of materials being ground upon the teeth of the shredder ring. Another important result is the increased length of wear of the shredder ring since the severe vibrations and shocks to the ring are assimilated by the resilient mount. This mounting permits slight lateral movement of the ring during operation to prevent the particles being ground from being wedged against the side of the ring thereby reducing jamming. The present design also uses a thin steel shredder ring rather than a cast shredder ring to increase its wearing life and to take up less space and permit full use of the advantages of the resilient mounting for the ring.

The cylindrical socket 74 for the ring, as may be seen in Figure 2, is provided at its outer surface with vertical ribs 110 which bear against the cylindrical support 112 in the upper end of the casting 30. The spaces between these spaced ribs 110 permit the socket 74 to be more readily compressed and be more resilient for supporting the ring 76. Thus, shocks and lateral movements to the ring are much more readily assimilated and yet an adequate strong supporting socket 74 is provided for carrying the ring.

For carrying the waste particles against the shredder ring to grind, macerate, comminute, shred or cut the particles into smaller particles, a rotor 114 is provided which is driven in rotation about a vertical axis. The rotor carries a serrated cutting ring 116 which is provided with teeth or notches 118 in its outer edge. The rotor also carries one or more impeller blades 120 which engage the waste material impelling, forcing or throwing it against the shredder ring 76. The impeller blades 120 are pivotally mounted in the rotor 114 on a pintle pin 122 to pivot about a horizontal axis. The pintle pin 122 is mounted across a slot 124 which extends radially from the rotor disk 114 and the impeller pivots in the slot to project above the upper surface of the rotor disk 114 a controlled amount to vary the area of the impeller that is exposed.

In the arrangement illustrated, the impeller blades 120 are arranged to be automatically and positively retracted upon the starting of the rotor 114 so that if material is in the grinding chamber when the rotor starts it will not jam or stall the motor at the point when the motor has its lowest torque. The impeller blades are also arranged so that they will positively be retracted when an extremely heavy load is engaged so as to prevent stalling the motor and jamming the rotor. The retraction will be accomplished without the necessity of slowing the speed of operation of the motor.

Further, the raising or lowering of the impeller blades is a positive action and will not be prevented by materials which are against the impeller blades as sometimes occurs when heavy loads are encountered, or by foreign materials such as grains of sand which wedge beside the impeller blades.

The rotor 114, as is shown in Figures 1 and 2, is made of a relatively heavy cast iron and is freely journalled on the drive shaft 34. A cap screw 126 is threaded into the top end of the shaft 34 and extends over the driven portion of the rotor 114 to hold it to the top of the shaft 34. The drive shaft 34 carries a driving hub 128 which is firmly secured thereto, such as by a key 130. To drive the driven portion of the rotor 114 by the driving shaft 34 and the driving portion of the rotor or the driving hub 128, a coiled torsion spring 132 extends between the hub and the rotor 114 in the manner shown in Figures 1 and 2.

The coil torsion spring 132 is connected to drive the cast iron rotor 114 by a bend 134 at right angles to the body of the spring with the bend suitably secured to the rotor. The other end of the coil torsion spring 132 is secured to the driving hub 128 by means of a plate 140 which is secured to the hub and which carries a vertically extending spring securing pin 138 to which the other end of the spring is secured by a loop 136 formed at its end. Thus, the only driving connection between the hub 128 and the rotor 114 is the coil spring 132. Under normal operation the spring 132 remains as it appears in Figure 2 and the rotor 114 will rotate at the same speed as the hub 128 and the driving shaft. With any resistance to the rotation of the rotor 114, however, the coil torsion spring 132 will tend to wrap around the center of the rotor while the hub and drive shaft continue to turn relative to the rotor. This, as will be seen, causes the impeller blades 120 and 148, as is shown in Figure 2, to pivot down into the flat surface of the rotor tube exposing less of their area, or to be retracted completely.

In order to effect the pivotal movement of the impeller blades 120 and 148 within their radial slots 124 and 150, the plate 140 which is secured to the rotating hub 128 carries a pair of arcuate cam grooves 142 and 146. Into these cam grooves extend impeller operating follower fingers, such as is shown at 144 in Figure 1. The follower fingers are secured to the impeller blades and are slidably located in the cam grooves 142 and 146 to pivot the impeller blades on their pintle pins such as 122 for the impeller 120. The cam grooves 142 and 146 are offset eccentrically relative to the axis of rotation of the impeller in shape so that when relative movement occurs between the cam groove and the follower finger which extends therein, the finger will follow the cam groove and move closer toward the axial center of the driving shaft 34. This will cause a pivotal movement of the impeller blades pivoting them downwardly into their supporting grooves.

For example, as is shown in Figure 2, if either of the impeller blades 120 or 148 strikes a resistance of unusual strength the rotor 114 will temporarily slow down relative to the drive shaft. The drive shaft 34 and the driving hub 128 continue with their forward movement and the driving spring 132 will begin to wind up on the rotor. This causes a relative movement between the cam plate 140 and the rotor, and the follower fingers of the impeller blades will therefore move along in the cam tracks 142 and 146 to pivot the impeller blades down into the surface of the rotor 114. This will move the impeller blades away from the resistance which has temporarily slowed or stopped the movement of the rotor and the impeller blades will tend to move under the resistance permitting the rotor to keep operating.

As soon as the rotor is free the spring 132 will permit the rotor and driving arm to assume their original positions and the impeller blades will again be pivoted to their full exposed position. If the resistance to the rotation of the rotor continues, however, the impeller blades will stay partially retracted within the surface of the rotor until the resistance is cleared. Thus, the amount of exposure of the rotor blades will be in proportion to the amount of resistance to the driving torque that is encountered by the rotor and the amount of grinding done by the rotor blades will be in proportion to the difficulty of grinding the particular material encountered. The speed of the drive shaft 34, however, will not be slowed down to a point where the grinder becomes inoperative but will continue rotating so that the grinding of the difficult piece of waste material can continue until the material is ground and out of the way.

The same retractive movement of the impeller blades into the surface of the rotor occurs when the rotor is first starting. This will prevent the rotor from stalling when the driving torque of the motor is at its lowest. Since the rotor 114 is made of heavy cast iron, during the time when the mechanism is accelerating there will be a resistance to the drive of the drive shaft. This resistance during fast acceleration due to the inertia of the heavy rotor will cause the coil spring 132 to wind up and permit relative movement between the cam plate 140 and the follower fingers of the impeller blades. This, of course, will pivot the impeller blades to a retracted position. If the grinding chamber is loaded with material when the mechanism is first started, the blades will be against grinding material at the very beginning, and this resistance to rotation of the rotor will cause the blades to be pivoted to a retracted position until the motor brings the rotor up to speed.

The mechanism for retracting the rotor blades when a resistance to torque on the rotor occurs, operates regardless of the speed of operation of the mechanism, and the operating structure thus does not impair the efficiency of the operation of the apparatus. The waste fluid which leaks down through the gap or slots 124 and 150 in which the impeller blades are mounted passes downward into the discharge chamber 28 to flow out the discharge conduit 26. The cam tracks are provided with openings at the bottom such as the hole 143 shown in the cam track 142, to permit the liquid to leak out of the cam track so that the track will not become corroded or fouled to prevent relative movement between the rotor and the driving hub.

The drive shaft 34 is driven by the motor 35 which is enclosed in the lower end of the housing 20. The upper end of the drive shaft 34 is enclosed in suitable bearings and a seal 152 surrounds the shaft to prevent the liquids coming from the grinder from leaking down into the motor. If a small amount of leakage occurs the fluid will pass into an opening 154 which leads from the chamber 156 on the motor side of the seal 152 down into the space 158 between the motor and the lower shell 32. The lower shell carries a small vent hole 160 which vents any fluid getting into space 158 either by leakage through the opening 154 or from condensation, and permits the fluid to pass out through the vent hole. The vent hole also admits air up into the space around the motor to prevent condensation.

Figure 6:
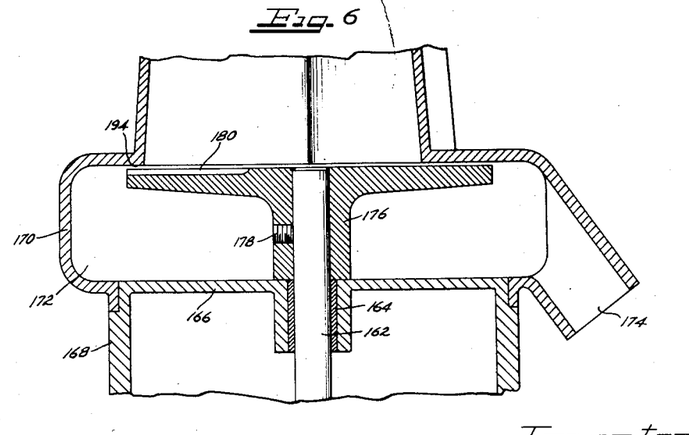
Figure 6 is a sectional view taken along line VI—VI of Figure 5 to illustrate the construction of the grinding mechanism of the embodiment of Figure 5.

As is shown in Figure 6, a direct drive to the rotor may be utilized. In this figure the drive shaft coming from the motor is illustrated at 162 being supported in a bearing 164 secured to a flat plate 166 extending across the housing 168. The upper portion 170 of the housing is provided with a discharge chamber 172 which leads to a discharge conduit 174 for discharge of the macerated food waste materials which are mixed with water and which are to be caried off through a drain.

The rotor disk 176 is fixedly secured to the upper end of the drive shaft 162 such as by set screw 178. The rotor disk consists of a flat horizontally disposed circular plate provided with a plurality of radially extending slots such as shown at 180 in Figure 6 and at 180, 182, 184, 186 and 188 in Figure 5. During rotation of the rotor the waste particles are caught by these grooves and forced against the mating grinding member which is formed by the lower edges of the walls of the grinding chamber 190.

Figure 5:
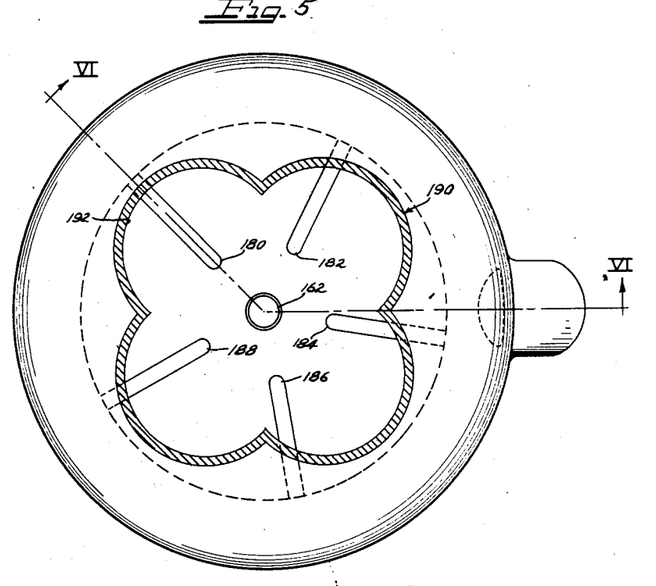
Figure 5 is a plan view of a grinder with a horizontal section taken through the grinding chamber to illustrate the shape of the chamber in the embodiment of this figure.

The grinding chamber 190 is clover-leaf shaped in plan view having a series of lobes or pockets such as shown at 192. The pockets terminate in the lower flat surface 194 beneath the grinding chamber and as the rotor 176 rotates the waste material is forced against the walls of the pockets to be ground.

Thus, the grinding chamber serves both as a chamber to feed the waste material downwardly and as a shredder ring to grind the waste material as it is forced against the walls of the pockets being carried by the grooves, such as 180 in the rotor. The walls of the clover-leaf shaped grinding chamber may be formed of metal but are preferably formed of a resilient elastomeric material similar to the walls in Figure 1. If the walls are formed of such material they preferably should be reinforced at their lower edge 194 by inserts of metal in order that the grinding function may be performed.

Figure 7:
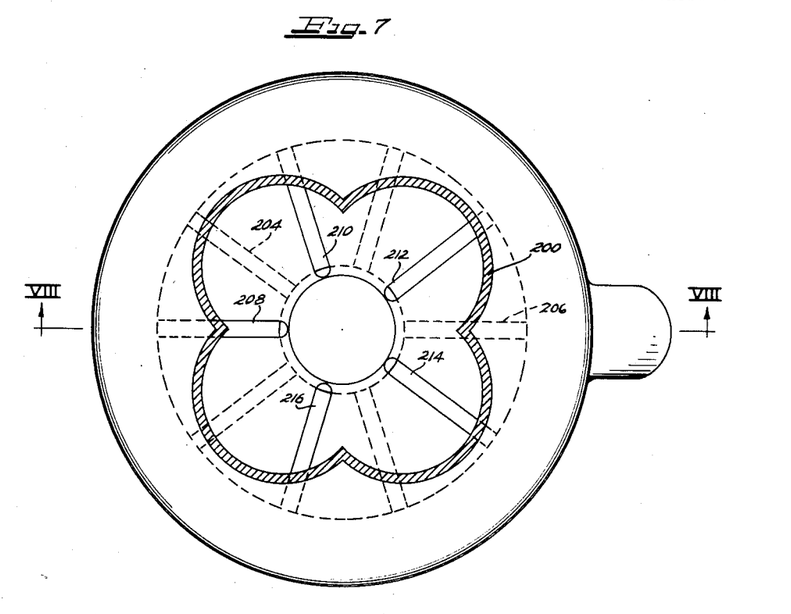
Figure 7 is a plan view of a grinder with a horizontal section taken through the grinding chamber.
Figure 8:
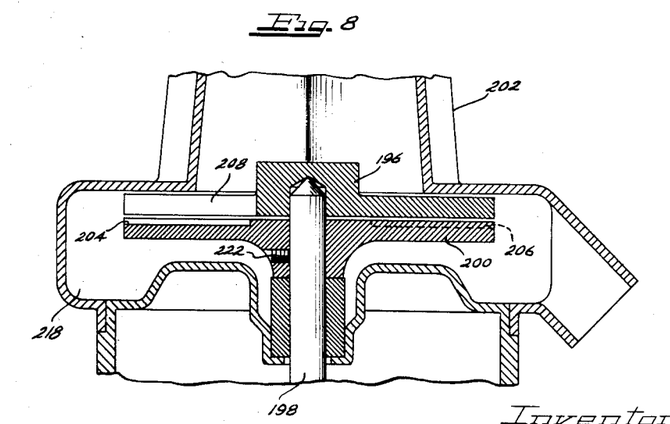
Figure 8 is a vertical sectional view taken along line VIII—VIII of Figure 7 to show the structure of the grinding mechanism of the embodiment of Figure 7.

As illustrated in Figures 7 and 8, a fluid clutch arrangement may be provided to drive the grinding rotor. This fluid clutch drive insures that the rotor will be in operation only when a predetermined amount of fluid is running through the grinder. This will prevent the grinder from accidentally being started when the operator's hand is inserted into the grinding chamber or when a stick or cleaning member is inserted into the grinding chamber to clean the chamber or break any jams in waste material which may occur therein. The fluid clutch in Figures 7 and 8 is shown as used with a clover-leaf grinding chamber similar to that shown in Figures 5 and 6, although the clutch may be readily used with the cylindrical grinding chamber of Figures 1 through 4 wherein the clutch would be used to drive the driving hub 128 which operates the rotor.

The rotor is shown at 196 freely carried at the upper end of the drive shaft 198. Driving rotation of the rotor is obtained only through rotation of the lower clutch member 200 which will drive the rotor only when a predetermined quantity of liquid is passed downwardly through the grinding chamber shown at 202. The driving member 200 of the clutch is provided with a plurality of radially extending vanes such as those shown at 204 and 206. Passageways are provided in the upper rotor 196 which direct fluid downwardly to the clutch, and these passageways are shown in the form of radially extending slots 208 in Figure 8 and 208, 210, 212, 214 and 216 in Figure 7. These slots, such as 208, extend all the way through the rotor so as to channel the fluid down between the vanes 204 in the driving clutch member. When water flows downwardly to the slots it forms a bridge between the driving member 200 and the rotor 196 to drive the upper rotor 196 in rotation. In accordance with the present design the slots in the rotor also act as grinding members or grinding surfaces to force the material against the pockets of the clover-leaf shaped walls of the grinding chamber. It will be understood, however, that various types of rotors and shredder rings may be used with the rotor providing passageways to channel the fluid down to the clutch. When the fluid passes downwardly it cleans the slots in the driving member and the vanes in the driving member of the clutch and washes the ground material downwardly into the chamber 218 whereupon it is washed outwardly through the discharge opening.

The lower driving member of the clutch is fixed such as by a set screw 222 to the motor driven shaft 198 whereas the upper rotor portion 196 is freely journalled on the top end of the shaft and will receive rotation only through the means of the fluid clutch. Although the clutch is preferably used in the preferred form shown and described herein, it will be appreciated that variations following the principles of the disclosed invention may be utilized and the clutch will act as a safety measure preventing rotation unless water is passing through the disposer. The motor may be operated continuously if desired and the rotor grinder will not operate unless water is being fed to the machine. The clutch will be self-cleaning since the water will carry the ground small particles of waste material out from between the clutch surface.

In the arrangements illustrated in Figures 1 and 2, the impeller blades automatically retract on engaging waste material which offer unusual resistance to grinding. In some instances, however, the arrangement illustrated in Figures 9 and 10 may be utilized which also functions to prevent stalling of the rotor upon engaging certain substances and which also functions to automatically free itself by moving the shredder ring so that a different section of the cutting surface will engage the material.

Figure 9:
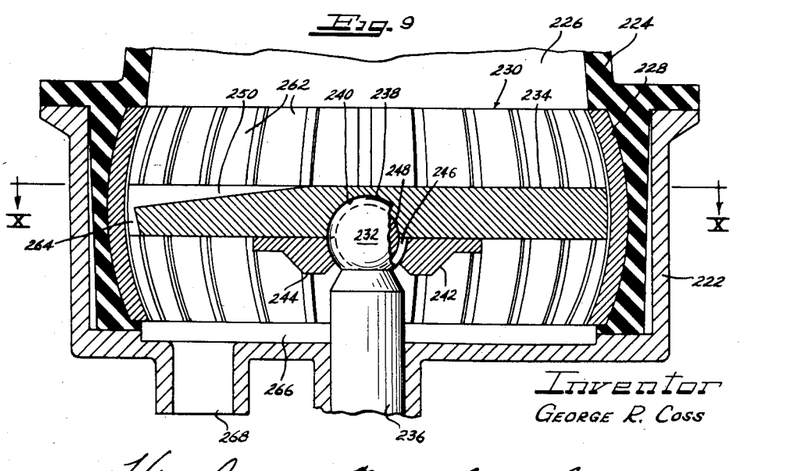
Figure 9 is a vertical sectional view taken through a grinder along line IX—IX of Figure 10 to illustrate the interior construction of an alternative embodiment of the invention.
Figure 10:
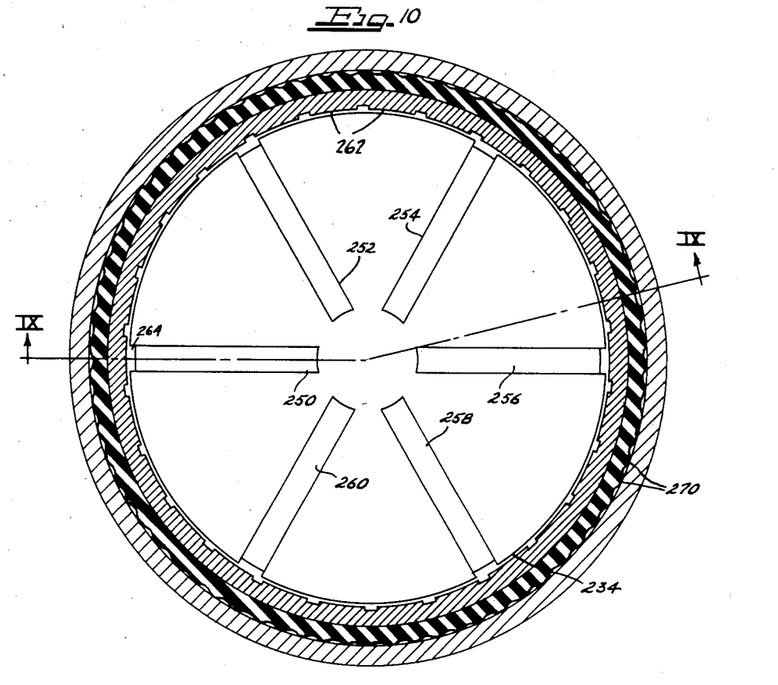
Figure 10 is a horizontal sectional view taken along line X—X of Figure 9 to illustrate the relative structures of the operating elements of the grinder of Figure 9.

In the embodiment of Figures 9 and 10 the housing for the disposer is shown at 222 and is provided with a resilient rubber-like liner 224 at its upper end to form the grinding chamber 226. The liner 224 extends downwardly into an annular socket in the housing 222 to provide the socket 228 for the shredder ring 230. The socket is cylindrical in shape with the walls being curved in a vertical plane to hold the shredder ring which is in the shape of a portion of a sphere having its spherical center at 232 which is also the pivotal and rotational center of the rotor 234.

The rotor is rotationally driven and is pivotally carried at the upper end of a driving shaft 236 which is provided with a spherical ball 238 at its upper end for driving the rotor. The rotor contains a spherical socket 240 to be attached to the spherical driving ball 238 and a pair of capping members 242 and 244 may be attached by suitable means (not shown) to the undersurface of the rotor to hold it in place on the spherical ball. A rib 246 which may be integral with the rotor may be provided positioned in a keyway 248 in the spherical ball to drive the rotor in rotation.

The rotor carries a plurality of slots such as 250, 252, 254, 256, 258 and 260 and the side walls of the slots will engage the waste material that passes downwardly from the grinding chamber 226 to force it against the vertical ridges 262 which form the grinding surfaces in the shredder ring 230. At the end of each of the slots 250 through 260 are cut notches such as shown at 264. These notches permit passage of the fine particles of waste material after they have been ground and permit them to drop downwardly into the chamber 266 beneath the rotor whereupon they are discharged outwardly through the discharge opening 268 to be washed down the drain.

During normal operation, the rotor is maintained in its horizontal position by centrifugal force as it spins with rotation of the drive shaft 236. With any amount of excessive pressure on one side of the rotor, however, as is encountered by a material such as a heavy bone, the rotor will deflect or tilt about its ball support 238 to accommodate the unusual pressure of the waste material in the location where the waste material is pressed against the rotor. The rotor will continue to deflect in the particular location of the bone causing it to wobble about its ball support and tend to force the bone material back upwardly, and in the meantime, shredding bits from the bone and forcing it against the ridges 262 in the shredder ring. The rotor will not be stalled by the obstinate bit of waste material and the rotor will continue to operate.

The same action holds true to the rotor when started if a load of waste material has been left in the grinding chamber from a previous action. Any obstinate bit of waste material which is caught in any of the slots will cause the rotor to deflect away from the slots permitting it to start, but it will not jam or stall at the beginning of the operation.

The shredder ring 230 again is mounted in a resilient rubber support which may be provided with vertical ridges 270 having spaced therebetween with the edges of the ridges resting against the walls of the socket formed in the housing 222.

Figure 11 is an alternative embodiment of the disposer and is illustrated as having a lower shell 272 which encloses the motor and the lower portion of the disposer and which forms part of the housing. The lower shell 272 is suitably connected to the intermediate casting 276 which joins together the lower shell 272 and the upper shell 274 to complete the housing. The intermediate casting 276 has inwardly projecting locking teeth 278 provided with gaps 280 therebetween, as is shown in the dotted lines of Figure 11 and at 282 as is shown in the solid line portion of the drawing. At the base of the upper shell 274 are spaced inclined locking surfaces 284 and 286 which project upwardly from the lower annular flange 288 of the shell 274. Gaps 285 are provided in the flange 288 between the locking surfaces 284 and 286. To join the intermediate casting and the upper shell 274, the locking teeth 278 are inserted in the gaps 285 in the flange 288 and the casting 276 is then rotated with respect to the upper shell 274 so that the teeth 278 climb the inclined locking surfaces 284 and 286 to securely connect the intermediate casting to the upper shell 274. The flange 288 of the upper shell rests on the shoulder 290 of the rubber liner 292 to secure the various elements in their relative secured positions.

The rubber liner is substantially cylindrical in shape and at its intermediate portion forms a grinding chamber 294. The lower portion of the liner 292 forms a socket 296 for holding the shredder ring 298. The socket is cylindrical in shape and is provided with an upper shoulder 300 against which the upper edge of the cylindrical hardened steel shredder ring 298 seats when in place within the socket 296. The lower annular edge 302 of the rubber liner tapers to a point to seat in a recess in the casting.

The upper end of the liner 292 narrows to form a circular opening 304 leading downwardly into the grinding chamber 294. The narrowed portion of the grinder forms a supporting neck 306 for the disposer and this neck portion is reinforced with a material 308 embedded therein. The reinforcing portion may be a fabric or may be cording of nylon, cotton, wire or the like to give strength to the material without substantially reducing its elasticity. With the neck being formed of thin material, as is shown in Figure 11, considerable vibration of the disposer will be assimilated by the neck and the disposer can, if desired, have lateral shifting movement to withstand vibration and shocks, and also to accommodate for minor adjustments in the position of the body of the disposer which must be made in order to connect it to a drain line.

At the base of the neck 306 is a groove 307 which receives the rounded bead 309 at the upper edge of the upper shell 274. This bead supports the weight of the shell 274 and hence supports the weight of the housing and of the grinder contained therein. This permits the rubber liner 292 and especially the side walls 360 which form the liner walls for the grinding chamber 294 to be relaxed and not be under tension and to thereby be free to flutter or vibrate during the grinding operation.

To secure the neck portion 308 to a sink to support the disposer, a mounting ring 310 is provided having an underhanging lip 312 which clamps firmly beneath the bead 314 on the upper end of the neck 306 of the rubber liner. The bead 314 is clamped firmly beneath a flange 316 on the tightening ring 318 which is part of the connector securing the apparatus to the sink 320. The tightening ring 318 carries internal threads 322 which thread into mating threads 324 in the connector ring 326. The connector ring is provided with an outwardly extending flange 328 which projects over the edge of the drain hole 330 in the sink 320. A sealing gasket 332 may be provided beneath the flange 330 to prevent water from entering the threads 324 of the flange. Another gasket 334 may be provided above the flange of the tightening ring 318. The lower outer surface 336 of the connector ring 326 is smooth to bear tightly against the inner surface of the neck 306 of the rubber support to prevent moisture from entering and passing upwardly between the ring and the supporting neck.

At the base of the grinding chamber 294 is mounted a shredder ring 298. In coacting relationship to the shredder ring and positioned coaxially relative thereto is the rotor 348 which is driven in rotation by a drive shaft 350. The rotor may be provided with a serrated cutting ring 352 and with impeller blades 354 which rotate with the rotor to force the waste material against the angular slots 356 cut in the shredder ring.

One of the important features of this embodiment is the series of continuous barbs or ridges 358 which project inwardly from the resilient flexible walls 360 for the grinding chamber 294, with the ridges being part of the rubber liner 294. These ridges are helically arranged so as to form a circling thread on the inner walls and are preferably constructed with a flat horizontally extending lower surface 362 and a tapered upper edge 364. The tapered edge will permit the waste material to pass smoothly downwardly within the cylindrical chamber as defined by the flexible liner 360, but the flat lower surfaces will tend to prevent the waste from being pushed back upwardly, as may be the case when the rotor 348 is rotating and strikes a hard piece of waste material. In addition, to prevent the waste material from pushing back upwardly the construction of the ridges 358 is such that the rotor rotates in the direction of the ridges as indicated by the arrow 366. The ridges 358 are inclined downwardly in this same direction so that if the entire mass of waste material within the grinding chamber 294 tends to rotate it will be screwed downwardly within the chamber or forced downwardly into pressing contact with the rotor spread out at the bottom of the mass to thereby increase the effectiveness of the grinding operation and to prevent any bridging over or hanging up of the waste material within the grinding chamber.

It is to be also noted that the inclined grooves 356 in the shredder ring 298 incline downwardly in the same direction as the rotation as shown by the arrow 364 of the rotor 248. These ridges also tend to thread the waste material downwardly within the grinding chamber to cause a more efficient and a more firm contact between the material and the rotor.

Further, since the ridges or continuous barbs 358 project outwardly and have a downwardly facing surface 362 they act as barbs preventing the return movement in an upward direction of the waste material. Since the side walls 360 of the grinding chamber 294 will not be under tension but will be relaxed and will constantly flutter during the grinding operation these inwardly extending projections will tend to work the waste material downwardly. With reoccurring engagement between the walls and the waste material as the side walls flutter the ridges will act as massaging fingers to force the material downwardly.

It will be noted in Figure 1 that the shredder ring 76 has a series of spaced teeth such as 368, 370 and 372 which are separated from each other and which are aligned so as to taper downwardly within the inner surface of the shredder ring. These tapered rows of teeth create the same threading-down effect when the rotor rotates in the direction as indicated by the arrow 374, in Figures 1 and 2. It is also to be noted that the teeth 368, 370 and 372 are of different sizes so that as the rotor rotates and the waste material is caught therebetween the waste material is ground into particles of different size.

In addition to the designs of teeth arranged on the inner surface of the steel shredder rings that are shown in Figures 1 and 9, Figures 17, 19 and 21 show additional designs which may be used in combination with the present mechanism.

Figure 17:
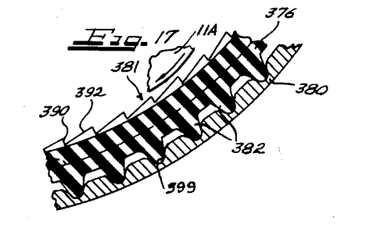
Figures 17 and 18 are horizontal and vertical detail sectional views respectively, illustrating a form of shredder ring assembly.
Figure 18:
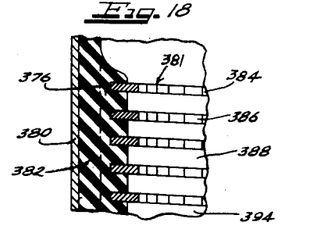

Figures 17 and 18, for example, illustrate the flexible rubber liner 376 for the grinding chamber as being provided with teeth set into the rubber. The steel shredder teeth 381 are formed in spirally extending strips or rings such as 384 and 386, as illustrated in Figure 18 with the teeth 381 being cut into the steel rings which are embedded in the rubber 376. Each of the rows of shredder teeth projects radially inwardly from the inner wall 388 of the rubber shredder ring which is integral with the grinding chamber wall, and the teeth are arranged as shown in Figure 17 to have a flat surface 390 facing the direction of rotation of the rotor and to have a tapering back surface 392 leading away from the front flat surface to form a sharp cutting point therebetween.

The sharp cutting points shred or cut the waste material and as it is cut into smaller particles the particles pass downwardly in between the rows of cutting teeth to be engaged by a succeeding row of cutting teeth until they are reduced to a substantially small size to drop downwardly between the teeth to the area 394 which leads to the discharge of the disposer.

Figure 19:
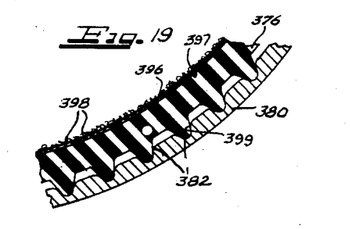
Figures 19 and 20 are also horizontal and vertical sectional detail views, respectively, illustrating another form of shredder ring assembly.
Figure 20:
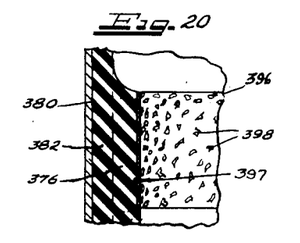

In the shredder ring shown in Figures 19 and 20, the annular metal ring 396 is set into a cylindrical holding surface 397 formed in the rubber liner 376 which is held within the socket within the housing 380 of the disposer. Fused to the shredder ring are abrasive particles, shown at 398. These abrasive particles may be heat fused or otherwise attached to the inner surface and spaced from each other to form a shredding surface which macerates the waste material as it is thrown against the surface by the impeller blades of the rotating rotor.

Figure 21:
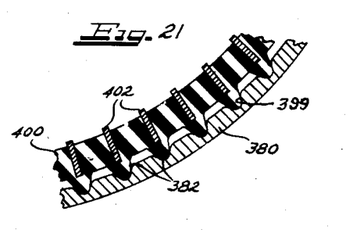
Figures 21 and 22 are horizontal and vertical sectional detail views, respectively, showing a further form of shredder ring assembly.
Figure 22:
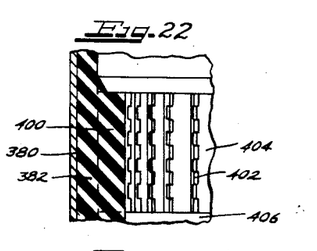

In the shredding arrangement shown in Figures 21 and 22, vertical strips 402 of hardened steel provide with projecting teeth are embedded directly in the rubber liner material 400. The strips 402 have sharpened inner edges and, being resiliently mounted in the rubber liner material, will yield with severe shock and retain their sharp edge in performing cutting operations during the rotation of the rotor.

When the material is sufficiently ground or cut by the sharp edges of the strips 402, it drops downwardly through the spaces 404 between the strips into the discharge area 406.

In each of the modifications shown in Figures 17 to 22 it may be seen that horizontally spaced vertical ridges 382 extend radially outwardly from the rubber liner a substantial distance and are set into corresponding vertical grooves 399 in the housing 380. This arrangement provides, as hereinbefore stated, a radially resilient shock absorbing mounting for the shredder ring, and in addition, provides for some circumferential movement of the shredder ring to thereby absorb circumferential vibrations and shocks. This radial and circumferential movement of the shredder ring also helps to prevent jamming which might be caused by pieces of bone or the like becoming wedged between the rotor and the shredder ring. The depressions 399 in the housing 380, retain the outer tips of the vertical ridges 382 in a substantially fixed position so as to prevent excessive movement of the shredder ring or the rubber liner and also help them to resume their normal position after an excessive load has been removed or overcome.

Figure 15:
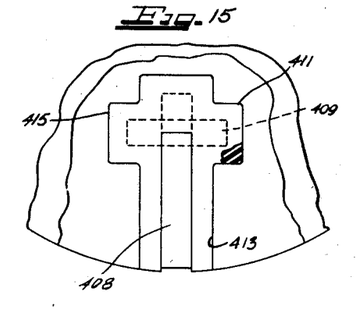
Figure 15 is a detailed enlarged plan view illustrating a resilient mounting for the impeller blade.
Figure 16:
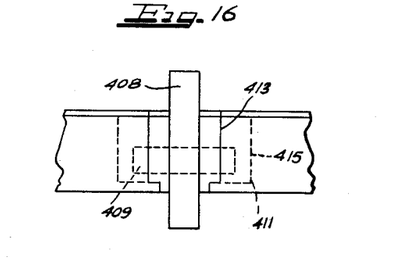
Figure 16 is a detailed enlarged elevational view of the mounting for the impeller blade which is shown in Figure 15.

In the rotation of the rotor to drive the waste material against the shredder ring to reduce the size of the waste particles, the shock against the impeller blade is quite severe when a rigid piece of waste material, such as a heavy bone, is caught between it in the shredder ring. To reduce the shock on the impeller blades and increase their life and also to reduce the noise of operation, the impeller blades may be set in rubber, as is shown in Figures 15 and 16. In this instance, the impeller blades 408 have their pintle pins 409 mounted at the ends in a rubber insert 411. The insert is slid or set into a slot 413, which is T-shaped with the base of the T shown at 415, to prevent the rubber insert from being thrown out of the rotor during rapid rotation. With this construction, any obstruction to the rotation of the rotor as it will occur during rapid grinding operation will cause the shock to occur at right angles to the impeller blade 408, and this shock will be then transmitted to the rubber insert where it will be assimilated both in force and in noise.

Thus, it will be seen that all operating parts which must sustain shock and impact are mounted in rubber and that parts which transmit the noise from the grinding zone and from the grinding chamber are carried in rubber and are insulated by rubber. Further, the housing is supported by a rubber support at the top which is placed under tension to assimilate vibrations and to prevent the noise from passing upwardly into the sink which acts as a sounding board.

Although the direct noise that is transmitted through the connection of the parts has been greatly reduced, a certain amount of noise will be emitted from the mouth or throat of the disposer during operation. To insulate this noise and prevent it from passing up through the mouth of the disposer and out into the room, the present invention contemplates placing a wall of water across the open mouth or entrance to the disposer which will prevent the sound from escaping.

To this end, a cup assembly 410 is positioned in the mouth or opening 412 leading to the grinding chamber 414 of the disposer. The cup assembly consists of an upper cup 416 and a lower cup 420. The upper cup has an outwardly extending flange 422 which rests on an annular shoulder 424 provided within the connecting ring 426. With the upper cup thus suspended by the flange 422 the lower cup is suspended beneath the upper cup on a plunger 428 which is threaded into a hub 430, which is centrally located in the lower cup 420. The body of the upper cup is somewhat smaller in diameter than the lower cup so that the side walls 432 of the lower cup may pass upwardly in telescoping relationship to the upper cup to pass between the side walls of the upper cup and the side walls of the connecting member 426. For up and down movement of the lower cup 420 in telescoping relationship, the plunger 428 is pulled up or pushed down and for this purpose the plunger conveniently carries at its upper end a manually graspable knob 434. To lock the plunger and the lower cup in the adjusted position the plunger has an upper and lower detent 436 and 438 in which seats a locking ball 440 carried in a radial opening 442 in the hub 444. An annular spring member 446 surrounds the hub 444 being held in a groove on the hub to bear against the locking ball 440 which is pressed in either detent 436 or 438. The lower cup 420 is shown in the lower position in Figure 14 and when the knob 434 is grasped to pull the shaft 428 upwardly the ball 440 will ride out of the detent 436 to seat in detent 438 and hold the cup in the uppermost position.

Each of the cups contains a flow hole with the hole in the lower cup being shown at 448 and the hole in the upper cup at 450. The holes are arranged so as to be in diametrically opposite positions with respect to the centers of the cups, as indicated by the location by the vertical shaft 428, and with this placement of the holes the water which flows downwardly from the sink must flow across the lower cup and out the lower hole 448. In addition to this unique placement of the holes the lower hole 448 is smaller than the upper hole 450 so that water will tend to back up in the lower cup and form a wall of water between the two cups. Any excess water which flows from the upper cup through the hole 450 into the lower cup must pass upwardly and flow over the side walls 432 of the lower cup, thus adding to the seal across the mouth of the disposer. This wall of water forms an extremely effective sound insulator preventing the sound from escaping from the grinding chamber 414 and passing out into the room.

In addition to forming a wall of water for a sound insulator the lower cup performs additional functions. It will be noted that the lower cup carries at 452 a resilient rubber plug inserted into a hole 454 in the base of the lower cup. The upper surface of this cylindrically shaped plug fits exactly into the hole 450 in the upper cup so that when the lower cup is raised the plug will effectively stop the hole 450 forming a stop for the sink. Thus, the cup assembly 410 may be left in place during normal usage of the sink and the sink can act as an ordinary drain with the flow of water being controlled by the position of the lower cup.

The cups, of course, easily lift out of the drain opening 412 when the disposer is to be used and garbage is inserted into the disposer.

Another important function of the multiple cup arrangement 410 is that the lower cup will act as an electrode in the circuit arrangement for operating the motor for driving the grinder.

It is to be noted that the rubber resilient material 456 which is used for the support for the grinder and for the wall of the grinding chamber serves as an excellent insulating material for the mounting of the upper electrode 458. The mounting ring 460, for this purpose, is provided with an opening 462 through which extends rubber to insulate the electrode 458. The electrode is provided with a terminal 464 to which is attached a lead 466 secured to the terminal by a knurled nut 468 threaded to the terminal to grip the wire of the lead 466. The inner end of the terminal 464 carries a plunger 470 which is urged, radially inwardly by a coil compression spring 473 held within the opening 475 within the rubber 456. The movable plunger end 470 of the terminal engages and makes electrical contact with the metal cup 420, the cup thus forming one terminal for the water which makes the bridging contact to complete the circuit. In this instance, the supporting rod 428 which carries the lower cup must be formed of an insulating material so that the lower cup is electrically insulated to form an electrode. The upper cup forms the other electrode forming electrical contact at its flanged edge with the connecting ring 426 which is electrically connected through the tightening ring 472 to the mounting nut 474 by virtue of these members being threaded to each other and being formed of metal. The mounting nut carries a terminal 476 to which is connected a lead 478. The terminal carries a knurled nut 480 which is tightened upon the terminal to clamp the wire of the lead 478 therebetween.

Thus, when water flows through the openings 450 and 448 of the upper and lower cups, it forms an electrical bridge between the two cups to complete the circuit between the terminals 464 and 476. However, only when sufficient water flows to form a continuous stream between these two openings will the electrical circuit be completed. If only a small amount of water drips or dribbles through the openings, this small amount being insufficient to properly operate the grinder, the electrical circuit will not be completed and the motor will not run. Thus, the terminal arrangement shown in Figure 14 acts as an automatic control to prevent operation of the motor when insufficient water is passing into the grinding chamber of the disposer and also acts as a control to automatically operate the grinder when the water is fully turned on.

The circuit for operating the motor is shown schematically in Figure 13. In this circuit the operating motor is shown at 482 connected by leads 484 and 486 to the circuit. Lead 486 is connected directly to the electrical supply line 488 and the other lead 484 connects to the electrical supply line 490 through the switches 492 and 494. Switch 494 is operated by plunger 496 and is in closed position when the garbage disposer is to be operated. If the arrangement of Figure 14 is used, switch 494 is replaced by a manually operated switch. The motor driving the disposer will not operate, however, until the contacts of switch 492 are bridged by the moving contact 498. The moving contact 498 is the upper arm of a bell crank with the bell crank pivoted about its elbow 500. The lower arm supports the magnetic armature 502. When the magnets 504 are energized the armature 502 will be drawn against them to pivot the bell crank to the right causing the contact arm 498 to bridge the contacts of switch 492 to thereby complete the circuit of the operating motor 482 to operate the grinder.

The magnets 504 are energized by bridging the contacts 476 and 464 which are also shown as the terminals in Figure 14. When these terminals are bridged by water in the disposer, the secondary winding 506 is closed to energize the magnets 504, the primary winding 508 being wound on another leg of the magnet and connected to the line leads 488 and 490. The coil 506 has a few windings so that it will present a low voltage circuit, thus avoiding the necessity of having a high voltage at the terminals in the mouth of the garbage disposal. This effects a safety measure avoiding the necessity of having to run the 110 volt system to a point where it might be contacted by personnel and the 110 volt system can be completely insulated from the body of the disposer and the chance of shorting due to water leaking into the circuit is avoided.

Figure 12 illustrates an alternate embodiment of the switching arrangement to operate the grinder only when a flow of water is passing therethrough. One of the low voltage electrodes is supplied at 512 at the base of the grinder. This electrode extends upwardly through a pair of conducting plates 514 and 516 which are mounted in an insulating washer 518. The other terminal of the circuit which corresponds to the terminal 476 of Figure 13 is shown at 528 being connected directly to the metal discharge conduit 524. When sufficient water runs down through the grinding chamber 526 past the rotor 522 and in the space 520 in order to bridge the gap created by the insulating washer 518, the two terminals 512 and 528 will be in circuit to close the circuit to the coil 506 of the magnet 504, as shown in the circuit diagram of Figure 13.

The switch 494 is operated by a plunger 496, as shown in Figure 13, and the location of the plunger 496 is illustrated in Figure 12. This plunger switch is depressed by the lower cup 420 being in the lower position and only when the plunger 496 is depressed will switch 494 be closed to complete the circuit in order to operate the motor. This acts as a safety measure and when the cup assembly 410 is not in place the motor cannot run thus preventing damage to personnel who may insert their hands down into the grinding chamber 526.

In order to prevent the chances of short circuits the cups which contact the plunger 496 are insulated from the sink and from the connecting ring 426 by an annular rubber roll 530 which is attached around the upper edge 532 of the upper cup 416.

Thus, the switching arrangement of either Figure 12 or 14 using the circuit diagram of Figure 13 presents a mechanism which will automatically operate the motor for driving the grinder only when a sufficient flow of water passes into the grinding chamber. Further, the circuit shown utilizes low voltage for the part of the circuit which is closed by water thereby presenting a safety feature reducing the chance of electrical hazard to operating personnel.

Although the operation of the disposer will appear clear from the description of the individual sections of the machine a discussion of the general operation of the mechanism should be helpful in understanding the overall objectives and advantages of the invention. With reference to Figure 1, the operator places garbage or a waste material into the disposal through the mouth 97 leading from the drain opening of the sink. The waste material passes downwardly through the throat 50 into the grinding chamber 46 where it will be engaged by the rotor 114. Since the grinding chamber 46 is cylindrical in shape it has a large volume and a considerable amount of material can be fed to the grinding chamber to be stored therein while the grinder is operating. The waste material which is lodged in the area surrounded by the shredder ring 76 is engaged by the impeller blades 120 mounted on the rotor 114 as the rotor rotates. The material is forced against the teeth 368, 370 and 372 of the shredder ring to be cut, shredded or macerated into various size particles which pass downwardly outside of the rotor through the serrated teeth 118 of the cutting disk 116. The small particles then pass down into the chamber 28 to be washed outwardly through the drain opening 26 by the water which flows down into the grinder from the sink.

During grinding operation, since the walls 44 are formed of a flexible elastomeric material and are not under tension but relaxed, the walls 44 will continue to flutter or vibrate improving the feeding operation and preventing the material from bridging across the grinding chamber. The relaxed walls also function to absorb many of the noises which occur during the high speed grinding operation. Other noises are assimilated by the rubber support afforded by the heavy rubber collar 48 which carries the grinder housing 20 suspended beneath the sink. With reference to Figure 14, the noises are prevented from escaping through the open mouth 412 leading to the grinder by the wall of water which is present between the flat restrictive surfaces of the upper and lower cups 416 and 420. This wall of water will also form a low voltage bridge between the terminals 464 and 476 to cause operation of the grinding motor which drives the rotor.

Returning to Figure 1, the motor drives the driving shaft 34 which through a torsion spring 132 drives the rotor 114. The impeller blades 120 which are pivotally mounted in the rotor carry follower fingers 144 extending downwardly into cam tracks 142 which operate to control the position of the impeller blades so that when excessive load is encountered or due to the inertia of the heavy rotor 114 at starting, the blades will pivot down into their slots on the rotor to reduce the load of the blades and thereby prevent stalling or slowing of the drive motor.

The rotor and the impeller blades rotate in the direction indicated by the arrow 374 and the waste material which assumes a mass form in the grinding chamber is forced downwardly due to the inclined arrangement of the teeth in the shredder ring 76. With reference to Figure 11, the ridges 358 which may be located on the inner surface of the flexible wall of the grinding chamber also tend to force the waste material downwardly as the rotor tends to turn the entire bulk of material in the direction of rotation of the rotor, as indicated by the arrow 366.

Thus, it will be seen that I have provided an improved disposer and grinding machine which meets the objectives and advantages hereinbefore set forth. The disposer is simple to install and is adjustable to meet varying circumstances. The disposer is extremely quiet in operation with the combined novel elements serving to block the flow of sound from the disposer and to assimilate vibrations and shocks to all operating parts to prevent them from reaching the upper part of the grinder and from reaching the sink.

The mechanism is designed to have an enlarged capacity and other features of construction cooperatively contribute to prevent jamming, stalling or stopping of the grinder from any of the reasons which are present in designs heretofore available.

The relaxed flexible wall within the grinder not only assimilates and muffles the sound but enhances the feeding of the waste material to the grinder and prevents the material from bridging over or clogging before it reaches the grinding shredder ring and rotor. Further, the design of the shredder ring is such that the noise of operation is reduced, the performance of the ring is improved in obtaining a better shredding and cutting operation, and the life of the ring is enhanced by being mounted in a resilient mount and being reversible. The mechanism is safe for operation by inexperienced personnel and the various features contribute toward preventing accidents and damage to the operator.

I have, in the drawings and specification, presented a detailed disclosure of the preferred embodiment of my invention, but it is to be understood that I do not intend to limit the invention to the specific form disclosed but intend to cover all modifications, changes and alternative constructions and methods falling within the scope of the principles taught by my invention.

I claim as my invention:

1. A food waste disposer comprising in combination a grinder including a shredding ring and an impeller, a housing for enclosing the grinder and including a grinder chamber for feeding waste materials to the grinder and a discharge chamber communicating with an outlet of the grinder to discharge and pass the ground materials to a drain, a connector adapted to be connected to the circular discharge opening of a sink, and a supporting member connecting the connector to the housing and having a first threaded ring adjustably connected to the connector, and a second telescoping ring secured to the housing and inserted in telescoping relation into the connecting ring, a first interior groove on the threaded ring and a second exterior groove on the telescoping ring, and a locking member positioned in said grooves and being larger than the space between said two rings to prevent the rings from being separated to permit relative rotation therebetween to rotate the housing of the grinder to connect to an available drain.

2. A food waste disposer comprising a grinder including a rotatable grinding member and cooperating stationary grinding member for macerating the waste material therebetween, a housing enclosing the grinder and provided with a discharge opening for transferring the ground material to a drain and defining a grinding chamber above the grinder, a connector for connecting the disposer to the drain opening of a sink including a first externally threaded flanged upper ring for positioning in a sink drain, a mating second internally and externally threaded flanged ring threaded to the first ring for positioning beneath the sink, said rings adjustable to connect to sinks of varying thicknesses, a coupling member threaded to the second ring and secured to the housing, and a sealed joint between the base of the first ring and the second ring to prevent the escape of waste material and water from within the housing.

3. A food waste disposer comprising a hollow housing for the disposer defining a grinding chamber at the upper end thereof, a support adapted to be connected to the drain opening of a sink and connected to the upper end of said housing to support the disposer from a sink, a waste material shredding member secured to the interior of the casing, a rotor adapted for rotation in close proximity to said grinding member, said rotor including a first driving part and a second driven part, a motor within the housing for rotating said rotor driving part, impeller blades carried on the rotor driven part to force the waste materials against the shredding member, and means connected between the driving and driven parts of the rotor and connected to the impeller blades to cause them to project with respect to the driven part of the rotor to engage the waste materials during normal operation and causing the impeller blades to retract with respect to the driven part of the rotor when a heavy load is encountered.

4. A food waste disposer comprising in combination a housing for containing a grinder, means to support the housing from the drain opening of a sink, a shredder member secured within the housing and having cutting surface against which the waste particles are forced to reduce their size, a rotor operatively positioned with respect to the shredder member and having a driving part and a driven part, an impeller blade secured to the driven part for movement toward or away from the driven part to increase the effective impeller area which engages the waste particles, impeller blade operating means connected between the blade and driving part of the rotor and operative to cause the impeller to move and increase the exposed operating surface with relative rotation between the driving and driven parts, and resilient means secured between the driving and driven parts and preventing relative rotation therebetween execpt with distortion of the resilient means, and power means for driving the driving part of the rotor, resistance to the driven part of the rotor causing relative rotation between the driving and driven part and causing the impeller blade to recede and reduce the effective operating surface thereof.

5. A food waste disposer comprising a grinding chamber for holding a supply of waste material to be fed to a grinder, support means for connecting the chamber to the discharge opening of a sink to receive waste material, a shredder member secured at the lower portion of the grinding chamber, a rotor adapted for cooperative movement relative to the shredder member to force waste particles against the shredder member to reduce their size, said rotor comprising a driving part and a driven part, waste grinding impeller means on the driven part of the rotor being movably positioned to move away from the driven part to increase the operative surface thereof, cam means positioned between the driving part and the impeller means and operative to cause the impeller means to move away from the driven part with relative rotation between the driving and the driven part, and means to prevent relative rotation between the driving and driven parts except with resistance to the rotation of the impeller means to thereby cause the impeller means to recede on encountering an excessive load.

6. A food waste disposer comprising a grinding chamber for feeding waste material to a grinder, means for connecting the grinding chamber to the drain of a sink and having a mouth for receiving the waste material and conveying it to the grinding chamber, a grinding member positioned in proximity to the grinding chamber to receive waste material therefrom, a rotary grinding member comprising a driving and a driven part, a waste impeller pivotally mounted on the driven part and adapted to be moved outwardly from the driven part to an increasingly operative position or to move to a retracted position, an arcuate eccentrically offset cam groove on the driving part, an operating follower on the impeller positioned within the cam groove and adapted to pivot the impeller toward a more operative position with relative rotation between the driving and driven part, and means to prevent relative rotation therebetween except upon the rotor encountering excessive loads to thereby retract the impeller and prevent the stalling of the rotary grinding member.

7. A food waste disposer comprising a shredder ring having toothed cutting surfaces on the inner surface of the ring, a rotor operating in proximity to the shredder ring, a grinding chamber positioned above the shredder ring to supply waste material thereto, a support secured to the upper end of the grinding chamber and adapted to connect the disposer to the drain opening of a sink, power means to drive the rotor in rotation, said rotor including a first driving means and a second driven means, an impeller blade pivotally mounted on the second driven means and adapted for pivotal movement from a recessed position where a minimum area of the impeller surface is exposed to an extended position where a maximum area of the impeller blade is exposed to force the waste materials against the shredder ring, an upwardly facing cam groove spaced outwardly extending from the axial center of the driven part of the rotor, a follower finger secured to the impeller blade and projected into the cam groove, a fluid drain opening in the base of the cam groove to prevent waste fluid from collecting therein, and resilient means for preventing relative rotation between the driven means and the driving means and urging the driven means in a direction to expose the impeller blade and move it to operative position, the impeller blade being retracted upon the driven portion engaging a severe obstruction to prevent stalling of the power means and possible damage to the parts.

8. A food waste disposer comprising a grinder including a shredder member and a rotating impeller to grind waste material therebetween, a hollow metal housing enclosing the grinder therein and defining a grinding chamber above the grinder, a driving motor located in the housing and operatively connected to the impeller of the grinder, support means connected to the housing and adapted for connection to the drain opening of a sink, a discharge conduit located within the housing for discharging the ground waste material with fluid to a drain, a drive shaft connecting the motor to the impeller of the grinder and passing through said discharge conduit, a seal substantially preventing moisture from passing along said drive shaft from said discharge conduit, an escape passageway communicating with the lower part of said housing and with the interior of said seal to conduct fluid which leaks through irrespective of the seal, and a second escape passage in the base of the housing permitting moisture which is within the housing to leak out of the housing.

9. A food waste disposer comprising a housing having a grinding chamber for holding a supply of waste material to be fed to grinding means, support means for connecting said housing to the discharge opening of a sink, a shredder member secured at the lower portion of said housing, a two part rotor adapted for cooperative movement relative to the shredder member, said rotor comprising a driving part and a driven part, means for rotatably mounting said driven part in operative position relative to the shredder member, means for driving the rotor in a forward direction, means pivotally connecting said driven part to said driving part for relative pivotal movement coaxial with the axis of rotation of the rotor, an impeller means mounted on said driven part of the rotor, impeller operating means connected to the driving part and connected to said impeller means and operative to move the impeller means to a more operative position with relative rotation of the driven part in a forward direction with respect to the driving part, and spring means connected between said driving and said driven part and biasing said driven part in a direction to urge the impeller means to a more operative position by action of said impeller operating means.

10. A food waste disposer in accordance with claim 9 wherein said spring means comprise a coiled spiral spring with one end connected to the driven part and the other end connected to the driving part and is connected so as to unwind with pivotal movement of the driven part relative to the driving part.

11. A food waste disposer comprising a housing having a grinding chamber, means for connecting the housing to the drain of a sink, said housing having a mouth for receiving the waste material and conveying it to the grinding chamber, a stationary grinding member positioned in proximity to the grinding chamber, a rotary grinding means cooperative therewith and comprising a driving and a driven part, a waste impeller pivotally mounted on the driven part and adapted to be moved outwardly to an increasingly operative position from a retracted position, an upwardly facing cam groove on the driving part, means defining a drain opening leading from said cam groove to drain liquid therefrom and prevent corrosion and fouling by liquid standing in the groove, an operating follower on the impeller positioned within the cam groove and adapted to adjust the impeller toward a more operative position with relative rotation between the driving and driven part, and means to prevent relative rotation therebetween except upon the rotor encountering excessive loads to thereby retract the impeller and prevent the stalling of the rotary grinding member.

References Cited in the file of this patent

UNITED STATES PATENTS

| | | |
|---|---|---|
| 2,115,134 | Andersen | Apr. 26, 1938 |
| 2,115,997 | Morse | May 3, 1938 |
| 2,139,944 | Fiscel | Dec. 13, 1938 |
| 2,165,946 | Smith | July 11, 1939 |

(Other references on following page)

UNITED STATES PATENTS

| | | | |
|---|---|---|---|
| 2,172,464 | Anderson | Sept. 12, | 1939 |
| 2,181,000 | Shively | Nov. 21, | 1939 |
| 2,220,729 | Powers | Nov. 5, | 1940 |
| 2,225,171 | Hammes | Dec. 17, | 1940 |
| 2,302,227 | Kasser | Nov. 17, | 1942 |
| 2,476,630 | Schindler | July 19, | 1949 |
| 2,484,459 | Osborn | Oct. 11, | 1949 |
| 2,501,275 | Heller | Mar. 21, | 1950 |
| 2,591,388 | Trotter | Apr. 1, | 1952 |
| 2,646,222 | Green | July 21, | 1953 |
| 2,682,376 | Frank | June 29, | 1954 |
| 2,730,308 | Jordan | Jan. 10, | 1956 |
| 2,743,875 | Brezosky et al. | May 1, | 1956 |
| 2,760,730 | Jordan | Aug. 28, | 1956 |
| 2,784,915 | Gordon | Mar. 12, | 1957 |
| 2,785,864 | Jordan | Mar. 19, | 1957 |
| 2,877,955 | Bebinger | Mar. 17, | 1959 |

FOREIGN PATENTS

| | | | |
|---|---|---|---|
| 502,784 | Great Britain | Mar. 24, | 1939 |
| 602,862 | Great Britain | June 3, | 1948 |
| 717,803 | Great Britain | Nov. 3, | 1954 |